Figure 1:
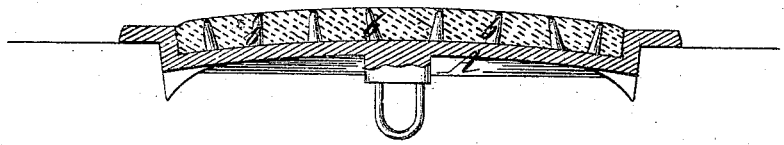

T. SHARTS.
Vault-Covers.

No. 147,438.  Patented Feb. 10, 1874.

Witnesses:  Inventor:
Ernst Bilhuber  Theodore Sharts
Henry _____  per
  Van Santvoord & Hauff
  Atty

UNITED STATES PATENT OFFICE.

THEODORE SHARTS, OF NEW YORK, N. Y.

IMPROVEMENT IN VAULT-COVERS.

Specification forming part of Letters Patent No. 147,438, dated February 10, 1874; application filed January 16, 1874.

*To all whom it may concern:*

Be it known that I, THEODORE SHARTS, of the city, county, and State of New York, have invented a new and useful Improvement in Vault-Covers and Sidewalks; and I do hereby declare the following to be a full, clear, and exact description thereof, which will enable those skilled in the art to practice the same, reference being had to the drawing forming part of this specification, in which drawing—

Figure 2:
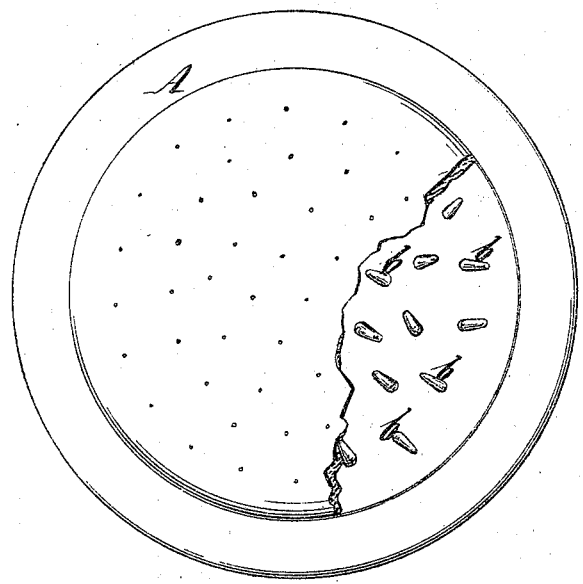

Figure 1 represents a transverse section of this invention. Fig. 2 is a plan or top view of the same.

Similar letters indicate corresponding parts.

This invention relates to a vault-cover or sidewalk the stepping-surface of which is formed of metallic spurs projecting from the base-plate of the cover, and of cement or concrete which is cast on said base-plate to a level with the points of the spurs in such a manner that, by the metallic points, the concrete is prevented from wearing smooth, and a stepping-surface is obtained which is not liable to become slippery.

In the drawing, the letter A designates a base-plate, which is made of cast-iron or any other suitable material, and in any desired form or shape. From this base-plate rise spurs $b$, which are cast into it, and which are set in oblique positions, being inclined in different directions, as shown. When the base-plate is finished, its surface is covered with cement or concrete of any suitable nature to a level with the tips of the spurs, so that the stepping-surface is in reality produced by the cement or concrete and by the tips of the spurs, the latter preventing the cement or concrete from wearing smooth. At the same time the spurs, on account of their inclined positions, retain the cement or concrete firmly in position and prevent the same from breaking loose.

By these means a vault-cover or sidewalk is produced which is very durable and cheap in its construction, and which presents a safe foothold for travel during all seasons of the year.

What I claim as new, and desire to secure by Letters Patent, is—

The arrangement in or on a base-plate, A, of a stepping-surface composed of tips of spurs $b$ rising from said base-plate and of cement or concrete retained in or on the base-plate by the spurs, substantially as shown and described.

THEODORE SHARTS.

Witnesses:
   W. HAUFF,
   E. F. KASTENHUBER.